United States Patent [19]

Downer et al.

[11] Patent Number: 4,785,212
[45] Date of Patent: Nov. 15, 1988

[54] LARGE ANGLE MAGNETIC SUSPENSION SYSTEM

[75] Inventors: James R. Downer, Somerville; David B. Eisenhaure, Hull; Stephen R. O'Dea, Wilmington; Tim E. Bliamptis, Lexington; Rhonda R. Mariano, Winchester; Laura J. Larkin, Somerville, all of Mass.

[73] Assignee: The Charles Stark Draper Laboratory, Inc., Cambridge, Mass.

[21] Appl. No.: 854,006

[22] Filed: Apr. 21, 1986

[51] Int. Cl.⁴ ............................................. F16C 39/06
[52] U.S. Cl. ................................................. 310/90.5
[58] Field of Search ................ 310/90.5, 74, 113, 153, 310/178; 244/166, 165; 324/200

[56] References Cited

U.S. PATENT DOCUMENTS

| | | | |
|---|---|---|---|
| 3,158,750 | 11/1964 | Roes | 318/35 |
| 3,591,108 | 7/1971 | Perkel | 244/165 |
| 3,785,709 | 1/1974 | Atkinson | 310/90.5 |
| 3,787,100 | 1/1974 | Habermann | 310/90.5 |
| 3,845,995 | 11/1974 | Wehde | 310/90.5 |
| 3,955,858 | 5/1976 | Poudeau | 310/90.5 |
| 4,154,489 | 5/1979 | Lyman | 310/90.5 |
| 4,164,018 | 8/1979 | Legrand | 310/113 |
| 4,170,904 | 10/1979 | Fischell | 244/166 |
| 4,179,719 | 12/1979 | Stanton | 322/4 |
| 4,211,452 | 7/1980 | Poubeau | 310/90.5 |
| 4,363,255 | 12/1982 | Poudeau | 310/90.5 |
| 4,444,444 | 4/1984 | Benedetti | 310/90.5 |
| 4,470,644 | 9/1984 | Weisser | 310/90.5 |
| 4,483,570 | 11/1984 | Inoue | 310/90.5 |
| 4,500,142 | 2/1985 | Brunet | 310/90.5 |

FOREIGN PATENT DOCUMENTS 2823910 12/1978 Fed. Rep. of Germany .
2423876 11/1979 France .
2081991 2/1982 United Kingdom .

OTHER PUBLICATIONS

Physics, Part II; D. Halliday et al.; John Wiley & Sons, Inc.; New York, London, Sidney; 11/7/85.
"Magnetic Bearing Momentum Wheels with Magnetic Gimbaling Capability for 3-Axis Active Attitude Control & Energy Storage"; 11/1977; R. S. Sindlinger; Teldix; Hidelberg, Germany.
Poubeau, "Statelite Flywheel with Magnetic Bearings & Passive Radial Centering", Journal of Spacecraft, vol. 17, No. 23, 7/1980.

Primary Examiner—R. S. Skudy
Attorney, Agent, or Firm—Joseph S. Iandiorio; Douglas E. Denninger

[57] ABSTRACT

A magnetic suspension system for a rotary machine including two magnetic actuators spaced from each other. Each actuator includes a stator which has a support shell with a plurality of coil windings, and a rotor which has an inclined annular gap for rotatably receiving the shell and a device for providing a magnetic field in the gap. The system selectively excites the coils to interact with the magnetic field in each gap and produce Lorentz forces for suspending the rotor of each actuator.

27 Claims, 7 Drawing Sheets

Z-FORCE

LARGE ANGLE MAGNETIC SUSPENSION SYSTEM

FIELD OF INVENTION

This invention relates to a magnetic suspension system and more particularly to such a system which combines bearing and gimbal functions.

BACKGROUND OF INVENTION

Spacecraft attitude can be controlled by transferring angular momentum to the craft through reaction wheels or control moment gyros. Typically, accuracy is compromised because conventional ball and gas bearings presently used to suspend these devices are unable to precisely maintain the orientation of the device's angular momentum with respect to the craft.

All conventional bearing systems, including magnetic bearings, suffer further limitations when used in large spacecraft. When transferring angular momentum from a rotating wheel to a spacecraft of modest size, such as a satellite, an angular tilt of 1° or 2° is usually sufficient. But when larger craft such as a space station is involved, much larger angles of typically 10 or 20 degrees are required to permit greater transfer of angular momentum.

Presently, one or two degree-of-freedom gimbals are added to control moment gyros to permit the required degree of tilt. Gimbal systems, however, add weight, complexity, and cost to the attitude control system.

SUMMARY OF INVENTION

It is therefore an object of this invention to provide a large angle magnetic suspension system which provides both bearing and gimbal functions.

It is a further object of this invention to provide such a suspension system which supplies gimballing of 10 to 20 degrees which is a large angle of bearing tilt.

It is a further object of this invention to provide such a suspension system which is of light weight.

It is a further object of this invention to provide such a suspension system which has low power consumption.

It is a further object of this invention to provide such a suspension system which is of small size.

This invention features a magnetic suspension system for a rotary machine including two magnetic actuators spaced from each other. For each actuator there is a stator including a support shell having a plurality of coil windings, and a rotor including an inclined annular gap for rotatably receiving the shell and means for providing a magnetic field in the gap. There is also means for selectively exciting the coils of each stator to interact with the magnetic field in each gap and produce Lorentz forces for suspending each rotor.

In one embodiment, the support shells are hemispherical and each inclined annular gap is hemispherical. Each support shell has two pairs of coils which may be disposed such that one coil of each pair is disposed opposite the other coil of that pair. The stators share a primary axis and are disposed such that they are diametrically opposed to each other. The means for selectively exciting may include means for sensing the position of the rotor along the axial and two radial axes and may further include means, responsive to the means for sensing, for determining the position of its center of mass of each rotor and for maintaining its center of mass at a predetermined position. The coil windings of the stators exert forces on the rotors to maintain the center of mass of each rotor at the predetermined position as controlled by the means for selectively exciting. The means for selectively exciting may also include means for measuring rotation of each rotor about two radial axes. The means for providing a magnetic field, such as an annular permanent magnet may provide a homopolar field.

In a preferred embodiment, the magnetic suspension system further includes a motor/generator having a stator and a rotor which has an inclined annular gap for rotatably receiving the motor/generator stator. The motor/generator stator and the motor/generator rotor gap may be hemispherical and the motor/generator rotor may be attached to both the actuator rotors.

This invention also features a rotary machine including two magnetic actuator bearings spaced from each other, each including a stator with a hemispherical support shell having a plurality of coil windings, and a rotor with a spherical annular gap. The rotary machine further includes means for selectively exciting the coils and a motor/generator having a hemispherical stator and a rotor having a hemispherical gap for rotatably receiving the motor/generator stator. The motor/generator stator may be disposed inside of and be concentric to the hemispherical support shells.

DISCLOSURE OF PREFERRED EMBODIMENT

Other objects, features and advantages will occur from the following description of a preferred embodiment and the accompanying drawings, in which:

FIG. 6 is a vector diagram of radial Y corrective forces;

The invention may be accomplished by a magnetic suspension system that selectively excites coils on a stator of each of two magnetic actuators serving as large angle bearings. Each stator is received by an inclined annular gap in a rotor of each actuator. Each rotor includes a magnet for producing a magnetic field which interacts with the variable coil excitations of its respective stator to produce Lorentz forces for suspending that rotor. The center of mass and the angle of the rotor can therefore be controlled for each magnetic actuator.

Figure 1:
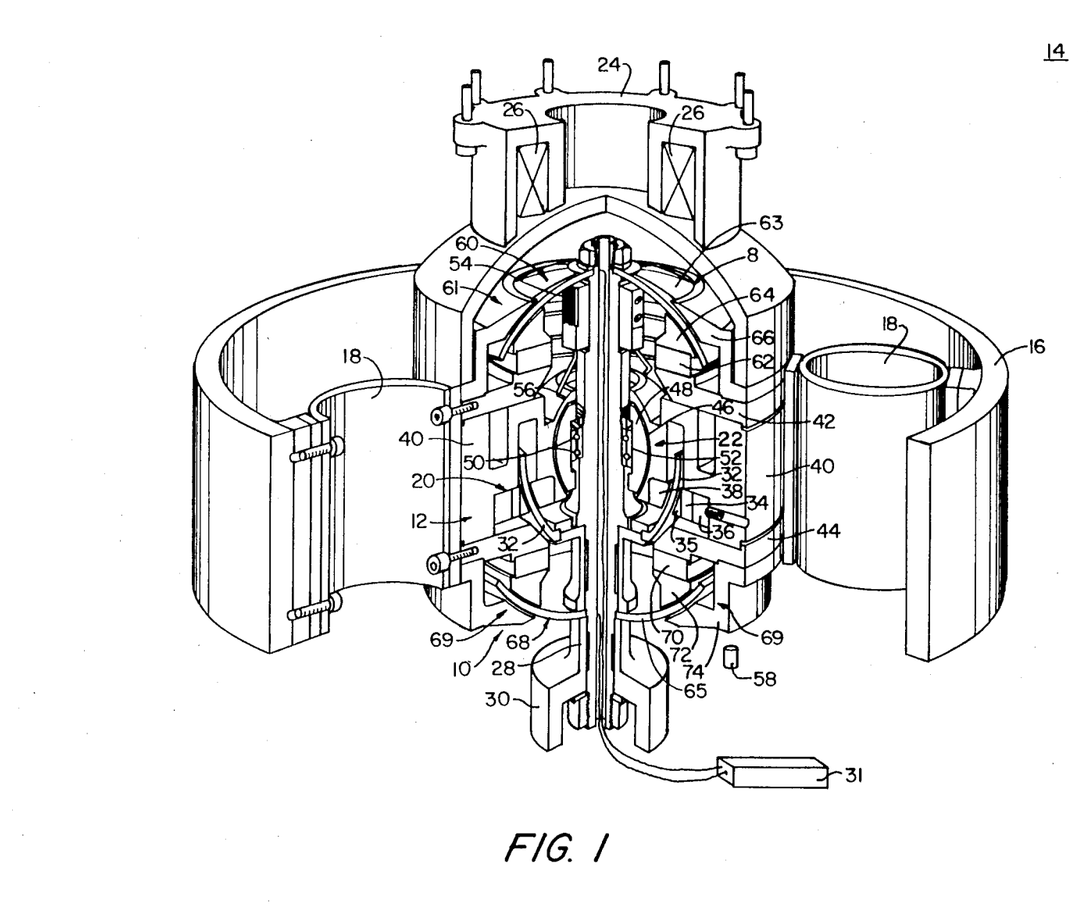
FIG. 1 is a partial cutaway of an axonometric view of the magnetic suspension system according to this invention that is incorporated into a rotary machine.

There is shown in FIG. 1 a suspension system including magnetic actuators 8, 10 within hub 12 of rotary machine 14. Rotary machine 14 also includes flywheel 16 attached to hub 12 by three spokes 18 made of a compliant material such as spring steel. Flywheel 16 is made of material such as ASI4340 steel or boron and epoxy. Hub 12 also includes motor/generator 20 and touchdown bearing assembly 22.

Magnetic actuators 8, 10 are designed to rotatably support hub 12 in a zero-gravity environment; lifting electromagnet 24 with coil 26 remains out of contact with hub 12 and is used to support it when gravity is present. Central shaft 28 supports the inner static portions of hub 12 about which the remainder of hub 12 rotates. Shaft 28 is fixed to the spacecraft by base plate 30 and has a passage for receiving wires linking the components of hub 12 with selective excitation circuit 31, described below.

Motor/generator 20 includes stator 32, made of a material such as 49% nickel-iron alloy and affixed to central shaft 28 and an annular rotor comprised of permanent magnet 34, pole piece 35, back iron 36, and return path 38. In this construction magnet 34 is composed of samarium cobalt. These rotor components are held in rotor support 40 which is associated with annular yokes 42, 44 of magnetic actuators 8, 10.

Touchdown bearing assembly 22 is disposed between rotor support 40 and shaft 28. Gap 46 lies between the inner surface of rotor support 40 and bearing housing 48. Gap 46 is maintained during normal operation: bearings 50 within bearing race 52 rotatably support the rotating portion of rotary machine 14 in the event of failure of magnetic actuators 8, 10.

Position sensor 54, disposed on shaft 28, is one of four optical position sensors for determining orientation in an XYZ coordinate system. Position sensor 54, e.g. FiberOptic Nano-Skan Part No. S56204 available from San-A-Matic, Elbridge, N.Y., emits a light from a light source such as a diode which travels down fiber optic 56 and is reflected from the surface of rotor support 40. The intensity of the reflected light indicates the amount of gap between the tip of fiber optic 56 and the metal surface below it.

Rotational displacement sensor 58 is one of four inductive sensors, such as Electro-Mike Part No. 85003 available from Electro Corp., Sarasota, Fla., which are positioned to measure rotation about the X and Y axes. The utilization of information from the four position sensors and four rotation sensors is described below.

Magnetic actuator 8 includes hemispherical stator 60 which lies within bearing rotor 61 comprised of permanent magnet 62 mounted on yoke 42, inner pole 64 and outer pole 66. Stator 60 includes hemispherical support shell 63 which is a material which is non-magnetic and preferably electrically non-conductive, such as aluminum, and poles 64, 66 are AISI 1018 steel. Similarly, magnetic actuator 10 includes stator 68 including support shells 65, and rotor 69 of permanent magnet 70 on yoke 44, inner pole 72 and outer pole 74. It is desirable for rotor support 40 to be non-magnetic; aluminum is preferred because of its low weight.

Motor/generator stator 32 is disposed inside of and is concentric with hemispherical bearing shell 63, 65. This configuration allows the rotating portion of hub 12 to tilt at least 10°-20° from the spin axis extending through central shaft 28. Stator 32 or shells 63, 65 of stators 60, 68 can be of other shapes, e.g., conical, but the spherical shape permits the rotors to remain spaced from the stators at approximately the same distance regardless of the degree of tilt.

Figure 2:
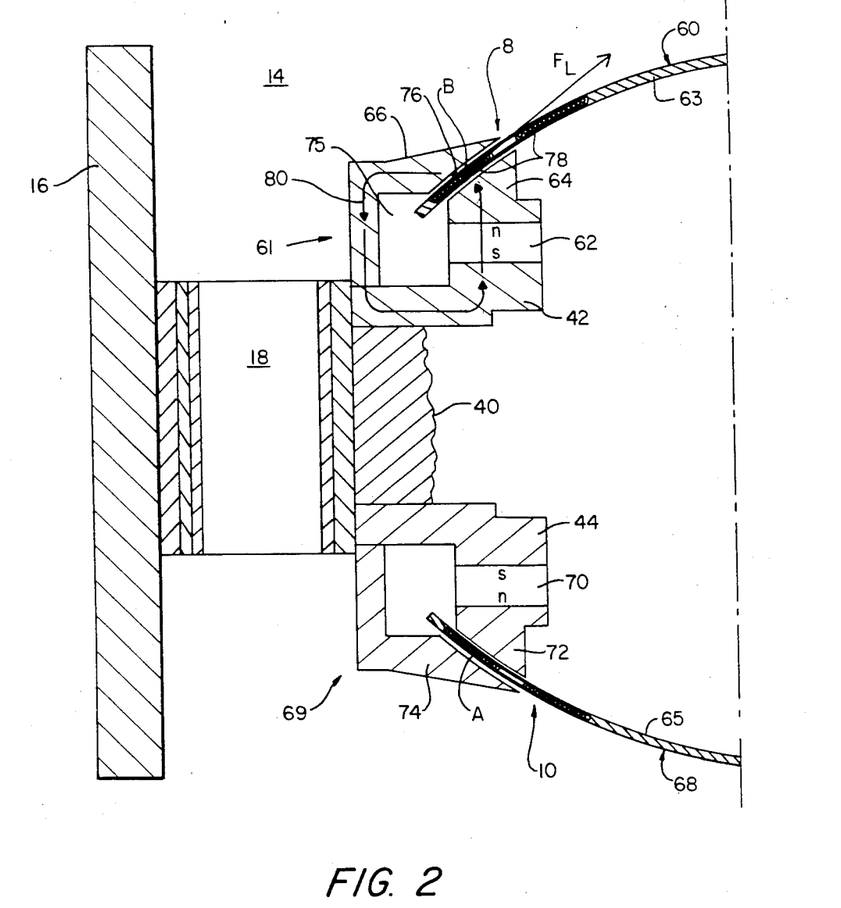
FIG. 2 is a schematic cross-sectional view of a portion of the suspension system of FIG. 1.

As shown schematically in FIG. 2, stator 60 of actuator 8 is slidably received by void 75 and by gap 76 between outer pole 66 and inner pole 64. While gap 76 is hemispherical, being arcuate in cross section to accommodate hemispherical stator 60, any inclined gap can be used which will accommodate an inclined stator such as a conical gap for a conical stator. Stator 60 includes four coils, such as coil 78, fabricated from wound copper. Electrical current supplied to coil 78 interacts with magnetic field 80 generated by annular homopolar permanent magnet 62. It is desirable that the flux of magnetic field 80 remain constant. Magnet 62 is constructed from segments of samarium cobalt bonded by epoxy.

Magnetic field 80 passes through poles 64, 66 and yoke 42 of rotor 61. Point B represents the locus from which Lorentz force $F_L$ is generated by the interaction of magnetic field 80 with excited coil 78. An equal and opposite reaction force is exerted on rotor 61.

Force $F_L$ extends in the opposite direction from locus B when current flow in coil 78 is reversed. Similarly, Lorentz forces are generated by magnetic actuator 10 at locus A to suspend and control the position of its rotor 69 relative to stator 68.

Figure 3:
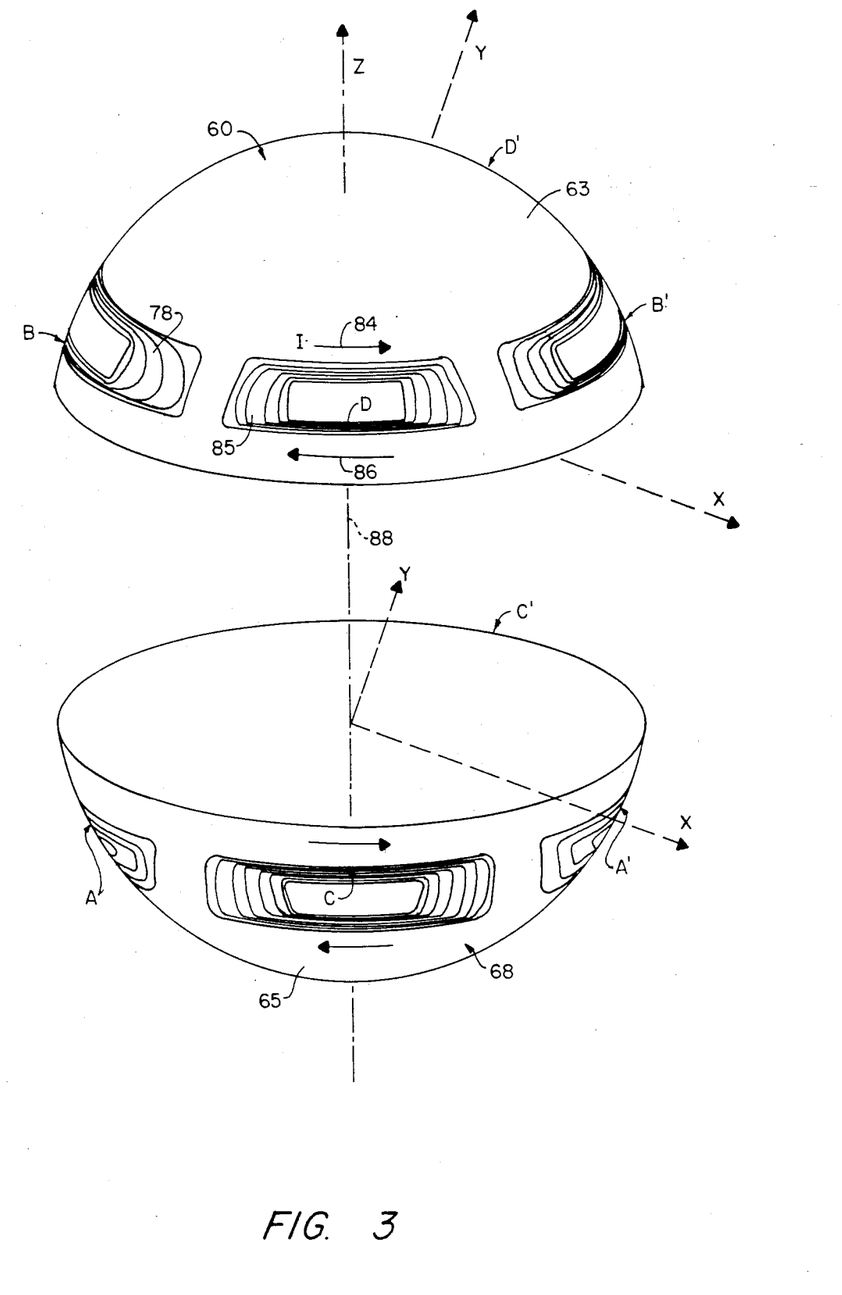
FIG. 3 is an exploded axonometric view of the stator shells of FIGS. 1 and 2 illustrating the axial and two radial coordinates in which they lie.

Lorentz force loci B, B', D, D' of stator shell 60 and loci A, A', C, C' of stator 68 are shown in an XYZ coordinate system in FIG. 3. Coil 85 is attached to shell 63 by electrically non-conductive epoxy. Current I flows through coil 85 as indicated by arrows 84, 86.

Axis Z is equivalent to primary axis 88 shared by stators 60, 68. Stators 60, 68 are disposed such that they diametrically opposed to each other.

Figure 4:
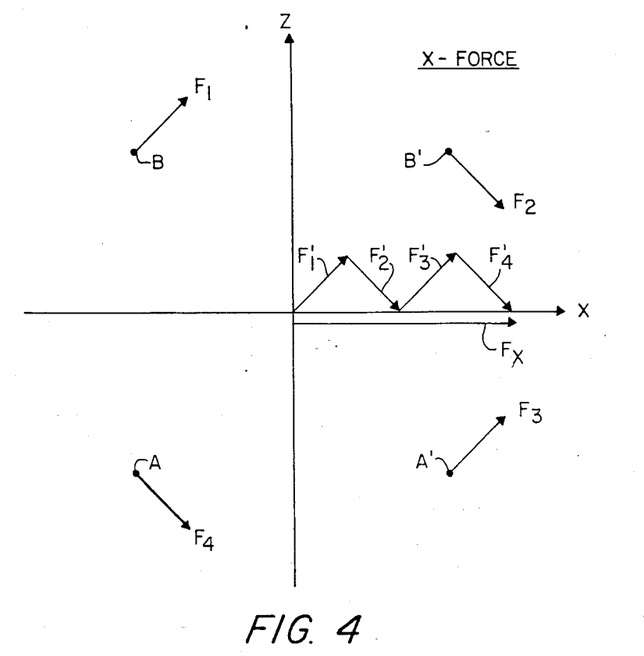
FIG. 4 is a vector diagram radial X corrective forces.
Figure 5:
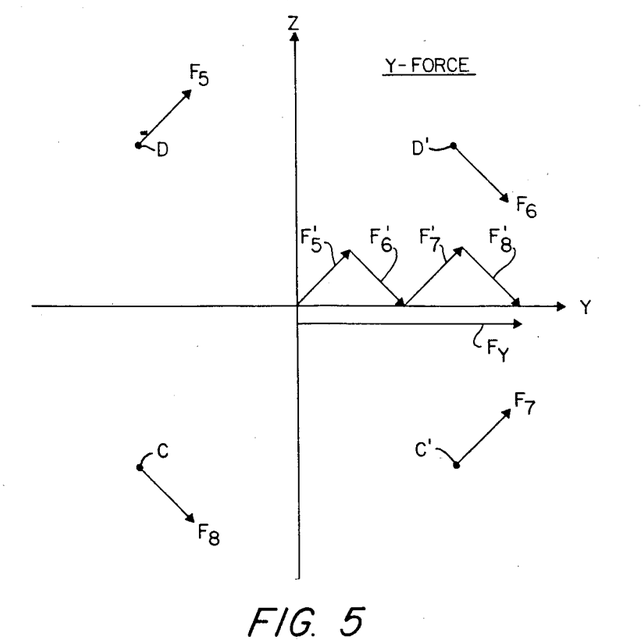

Lorentz forces generated from the loci illustrated in FIG. 3 are utilized to apply corrective forces and torques to rotors 61, 69. FIG. 2, of the magnetic suspension system. Use of radial X and Y forces are illustrated in FIGS. 4 and 5. Forces $F_1$ and $F_2$ originate from loci B and B', respectively, within the X-Z plane shown in FIG. 4. Similarly, forces $F_3$ and $F_4$ are produced from loci A' and A, respectively. Forces $F_1$, $F_2$, $F_3$ and $F_4$ are of equal magnitude. These vectors sum as $F_1'$, $F_2'$, $F_3'$, and $F_4'$ to provide resultant vector $F_x$ since the force components along the Z axis cancel each other.

Radial Y forces are produced in the positive Y-direction as shown in FIG. 5. Using different pairs of opposite coils, forces $F_5$ and $F_6$ originate from loci D and D', respectively, while force vectors $F_7$ and $F_8$ originate from loci C' and C, respectively, within the Y-Z plane. Force vectors $F_5'$, $F_6'$, $F_7'$ and $F_8'$ sum to provide resultant vector $F_Y$.

Corrective force along the axial or Z axis requires excitation of all eight coils of stators 60 and 68. One-half of axial force $F_Z$ in the positive Z direction is produced in the X-Z plane, FIG. 6A, by vectors $F_1$, $F_2$, $F_3$ and $F_4$ originating from loci B, B', A' and A, respectively. These vectors sum as $F_1'$, $F_2'$, $F_3'$ and $F_4'$ to generate resultant vector 90. Lorentz forces originating from loci B and A' are in the same direction as the forces shown in FIG. 4; however, the forces from loci B' and A extend from directions opposite those shown in FIG. 4.

Figure 6A:
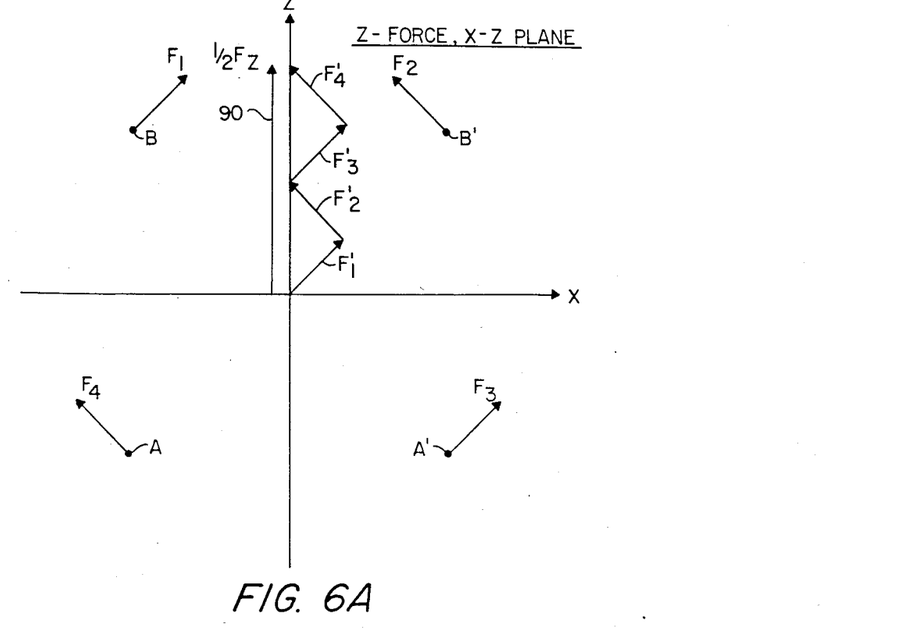
FIGS. 6A through 6C are vector diagrams of axial Z corrective forces.
Figure 6B:
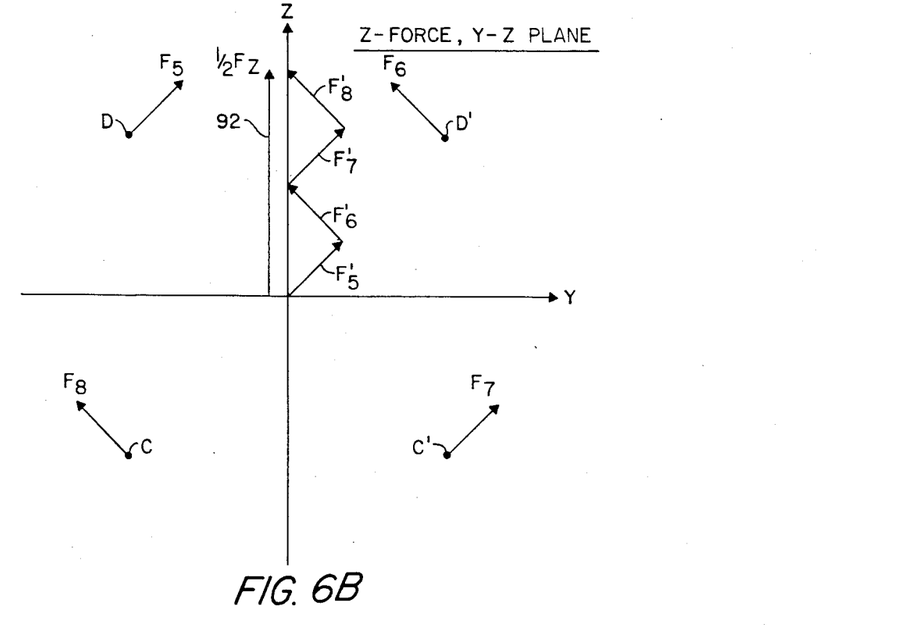

The other half of the axial corrective force in the positive Z direction is illustrated in FIG. 6B within the Y-Z plane. Force vectors $F_5$ and $F_6$ originate from loci D, D' located on opposite sides of stator shell 8 while force vectors $F_7$ and $F_8$ originate from C' and C of stator shell 10. As shown by summation of vectors $F_5'$, $F_6'$, $F_7'$ and $F_8'$, these forces provide resultant vector 92.

Figure 6C:
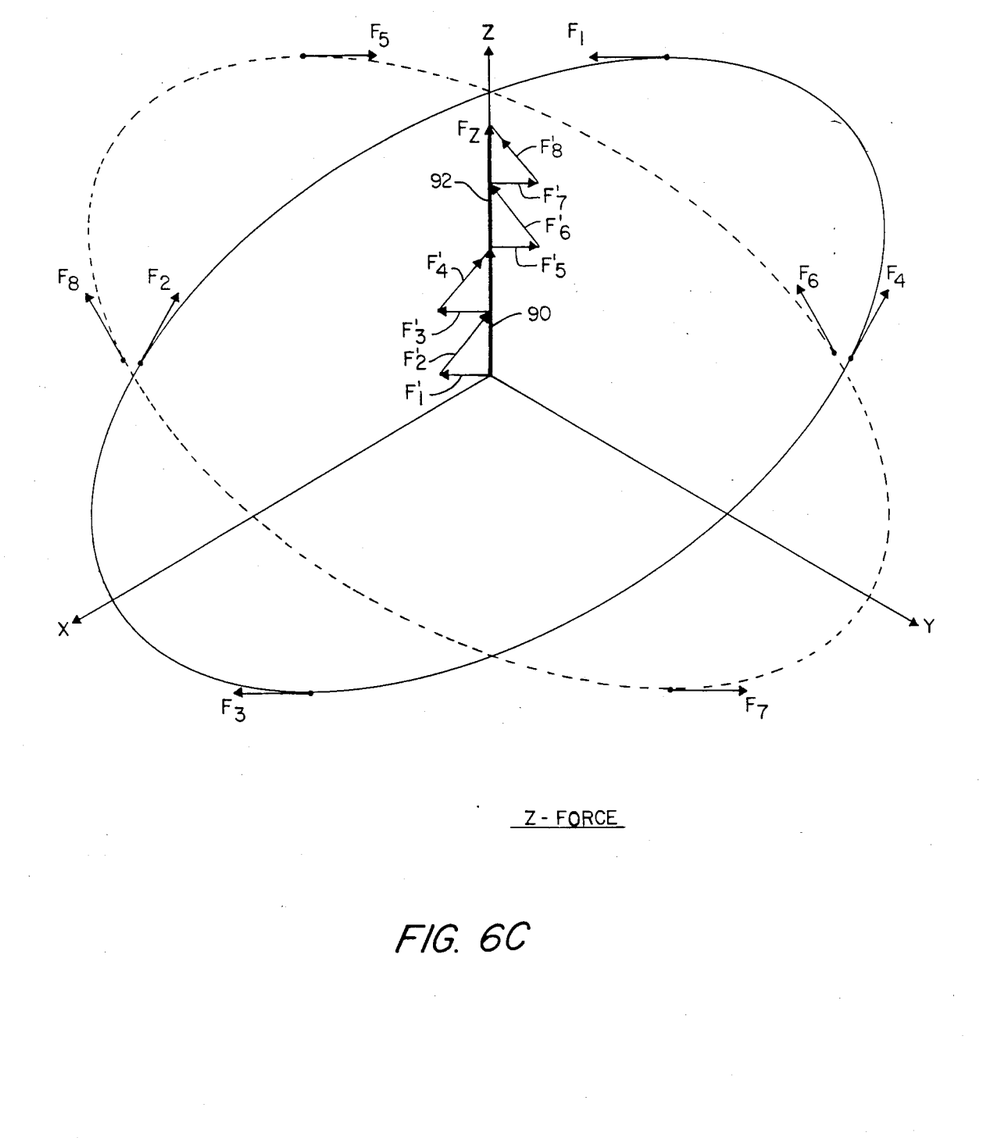

The combination of force vectors in the X-Z and Y-Z plane of FIGS. 6A and 6B is illustrated in FIG. 6C where the X plane is shown extending out from the plane of the paper. Vectors $F_1$ through $F_4$ are in the X-Z plane and while vectors $F_5$ through $F_8$ are in the Y-Z plane. Resultant vectors 90, 92 in combination provide axial corrective force $F_Z$.

Figure 7:
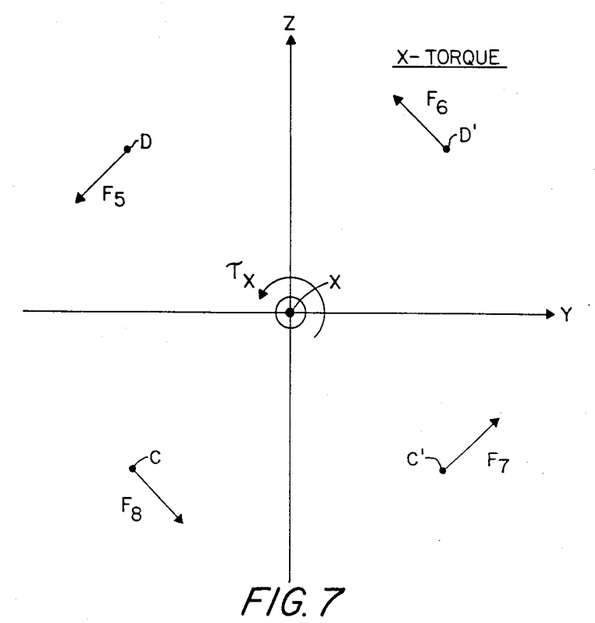
FIG. 7 is a vector diagram of corrective X-torque.

A different combination of Lorentz force vectors are utilized to apply corrective torques to rotors 61, 69, FIGS. 1 and 2. Torque about the X axis is shown in FIG. 7 where force vectors $F_5$, $F_6$, $F_7$ and $F_8$ are shown in the Y-Z plane originating from loci D, D', C' and C, respectively. The X axis rises out of the Y-Z plane; torque $T_X$ is shown about the X axis.

Figure 8:
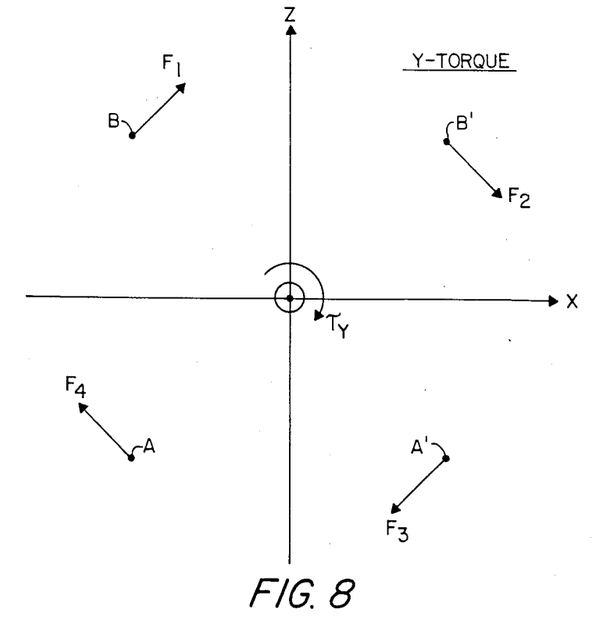
FIG. 8 is a vector diagram of corrective Y-torque.

Torque $T_Y$ about the Y axis is shown in FIG. 8 for loci B, B', A' and A, all within the X-Z plane. The Y axis extends away beneath the X-Z plane. Lorentz force vectors $F_1$, $F_2$, $F_3$ and $F_4$ generate torque $T_Y$ in a clockwise direction. Torque about the Y axis in a counterclockwise direction is achieved by reversing the direction of Lorentz force vectors at the four loci.

Figure 9A:
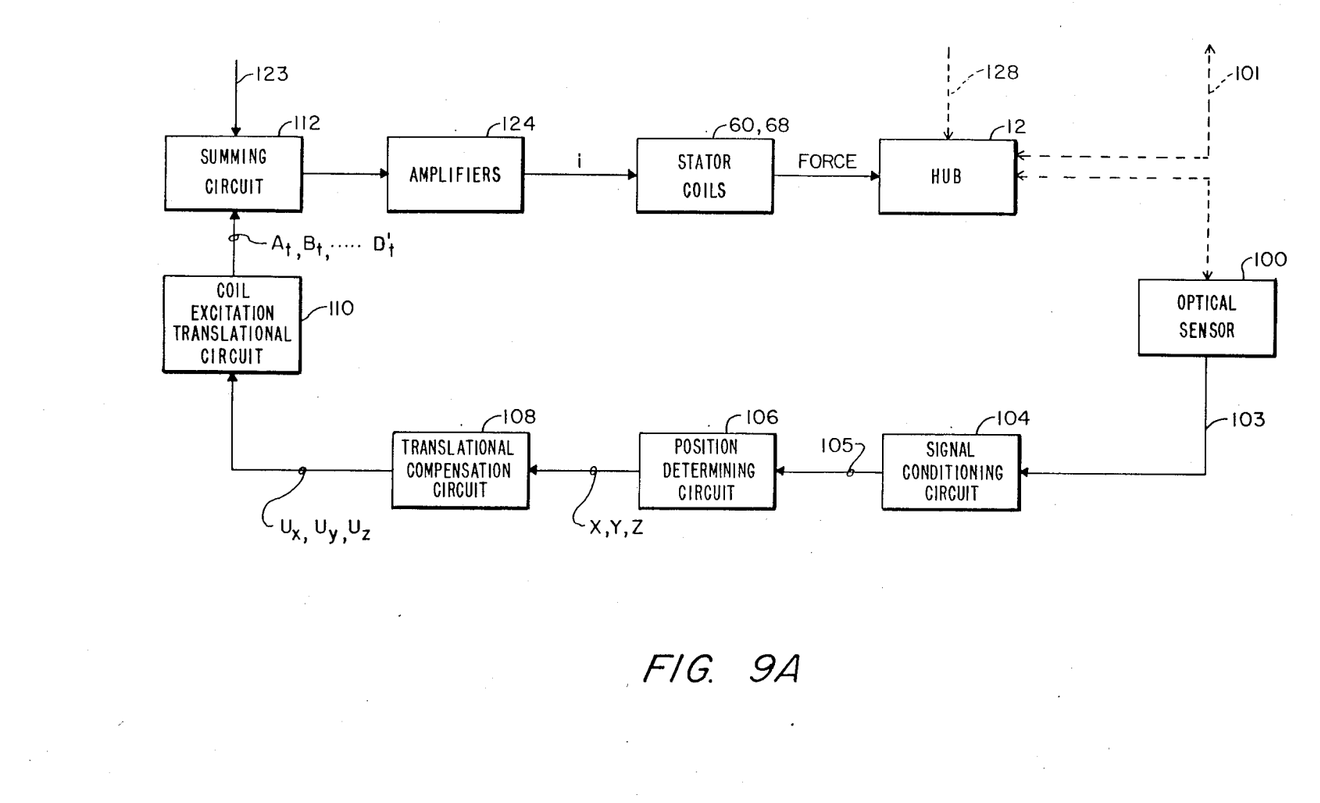
FIGS. 9A and 9B are schematic block diagrams of the circuits for controlling suspension through selective excitation of the stator coils.
Figure 9B:
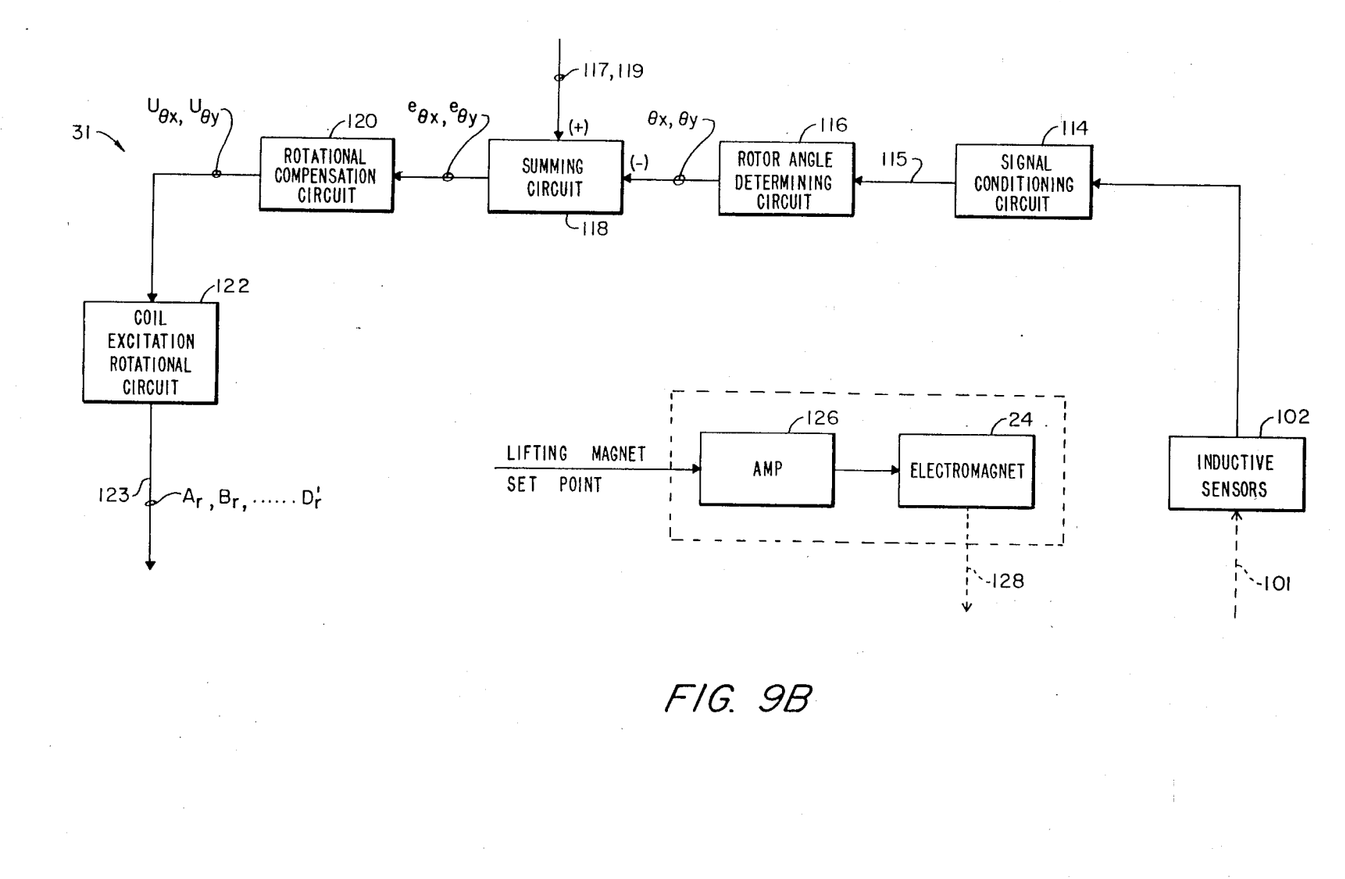

Selective excitation ciruit 31 for controlling the corrective forces and torques is depicted in FIGS. 9A and 9B. The orientation of hub 12 is monitored by optical sensors 100, FIG. 9A, and inductive sensors 102, FIG. 9B.

Optical sensors 100, including sensor 54, FIG. 1, determine the gap width between the rotating portion of hub 12 and the fiber optic sensors. The sensors are distributed at four points such as at 0°, 90°, 180°, and 270°. The four gap width signals 103 are submitted from optical sensors 100 to optical sensor signal conditioning circuit 104, FIG. 9A. Signal conditioning circuit 104 processes the gap width signals and submits normalized gap width signals 105 to center-of-mass position determining circuit 106. Position determining circuit 106 utilizes the four normalized gap error signals 105 to obtain three displacement signals in the X, Y, Z, coordinate system. The displacement signals X, Y, Z are provided to translational compensation circuit 108 which processes the three displacement signals into three force correction commands $U_X$, $U_Y$, and $U_Z$. These three force correction commands are submitted to coil excitation translational circuit 110. Corrective commands for each of the eight coils $A_t$, $B_t$, $C_t$, $D_t$, $A_t'$, $B_t'$, $C_t'$, $D_t'$ are submitted to summing circuit 112.

Inductive sensors 102, including sensor 58, FIG. 1, are also distributed at four points around the rotating portion of hub 12. Four gap width signals such as at 0°, 90°, 180° and 270° are obtained, dashed line 101, and are submitted to inductive sensor signal conditioning circuit 114, FIG. 9B. Circuit 114 produces four gap width deviation signals 115 which are submitted to rotor angle determining circuit 116. Determining circuit 116 provides two outputs, $\theta_X$ and $\theta_Y$ representing the rotor angles around the X and Y axes. These signals are negated and submitted to summing circuit 118 where they are each combined with rotor angle set point commands 117, 119, respectively, which are provided as external inputs. Rotor angle error signals $e_{\theta X}$ and $e_{\theta Y}$ are submitted to rotational compensation circuit 120 which produces torque correction commands $U_{\theta X}$ and $U_{\theta Y}$. Theser two torque correction commands are received by coil excitation rotational circuit 122 where correction commands $A_r$, $B_r$, $C_r$, $D_r$, $A_r'$, $B_r'$, $C_r'$, $D_r'$ are produced. The rotational commands are submitted, line 123, to summing circuit 112, FIG. 9A, where they are combined with the eight coil excitation commands $A_t$, $B_t$ ... $D_t'$ from circuit 110. Each of the eight net coil excitation commands A,B, ... D' is submitted to an amplifier in amplifying circuit 124. Amplifier circuit 124 produces eight current signals which are submitted to the eight magnetic bearing stator coils located on stators 60, 68. Positive current from circuit 124 produces a force vector in one direction for a particular coil while a negative current produces a force in the opposite direction. Forces are thereby exerted on hub 12.

Forces can also be applied on hub 12 by lift electromagnet 24, FIG. 9B. Magnet 24 is activated by an external lift magnet set point command amplified by amplifier 126. The resulting lifting force, dashed line 128, supports hub 12 when such support is desired, e.g., on Earth.

Figure 10A:
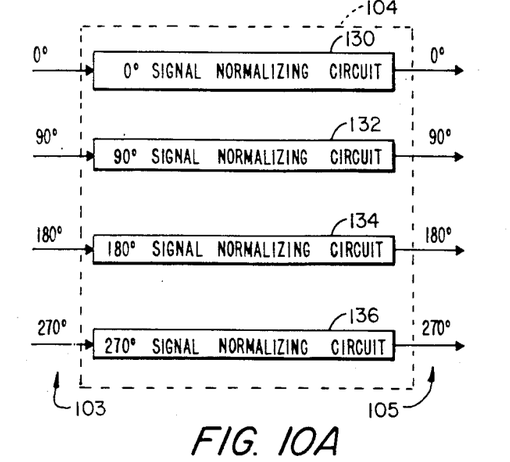
FIG. 10A is a more detailed schematic of the optical sensor circuit of FIG. 9A.
Figure 10B:
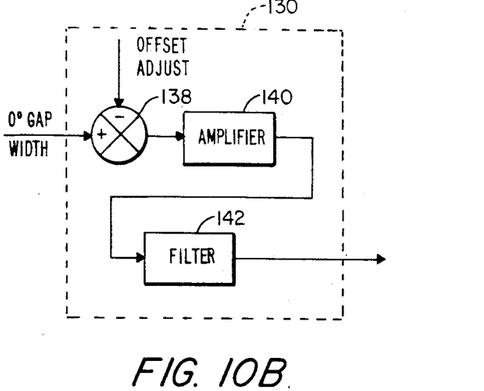
FIG. 10B is a more detailed schematic of one of the signal normalizing circuits of FIG. 10A.

Optical sensor signal conditioning circuit 104 is presented in greater detail in FIGS. 10A and 10B. Signal normalizing circuits 130, 132, 134, 136 process gap width values 103 at 0°, 90°, 180°, and 270°, respectively, to produce four normalized optical sensor gap width signals 105.

Signal normalizing circuit 130 is presented in more detail in FIG. 10B where the 0° gap width signal is provided to summer 138 and variable gain amplifier 140. Summer 138 combines an empirically determined offset adjust signal with the gap width signal; summer 138 and amplifier 140 serve to normalize individual optical sensors to compensate for manufacturing inconsistencies among the optical sensors. The corrected gap width signal, normalized to the other sensors, then passes through low pass filter 142.

Figure 11:
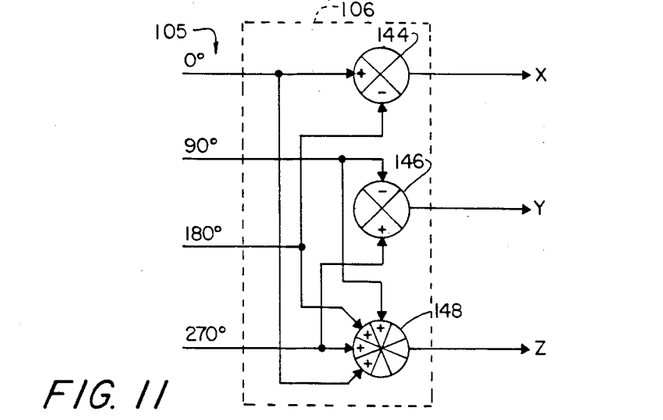
FIG. 11 is a schematic of the center-of-mass position determining circuit of FIG. 9A.

Center-of-mass position determining circuit 106, FIG. 11, combines normalized gap width signals 105 at 0° and 180° in summer 144 to produce displacement signal X, and combines the 90° and 270° normalized gap width signals in summer 146 to provide displacement signal Y. All four normalized signals are combined in summer 148 to provide displacement signal Z.

Figure 12A:
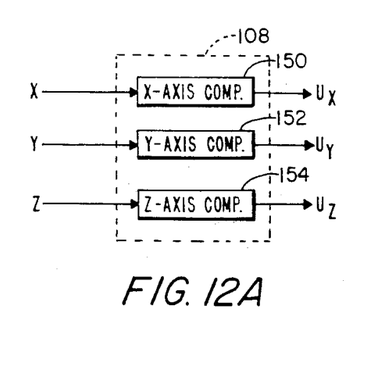
FIG. 12A is a schematic block diagram of the translation compensation circuit of FIG. 9A.

Translational compensation circuit 108, FIG. 12A, contains X-axis compensation circuit 150 which processes displacement signal X to provide force correction command $U_X$. Similarly, Y-axis compensation circuit 152 and Z-axis compensation circuit 154 receive displacement signals X, Y and provide force correction commands $U_Y$ and $U_Z$.

Figure 12B:
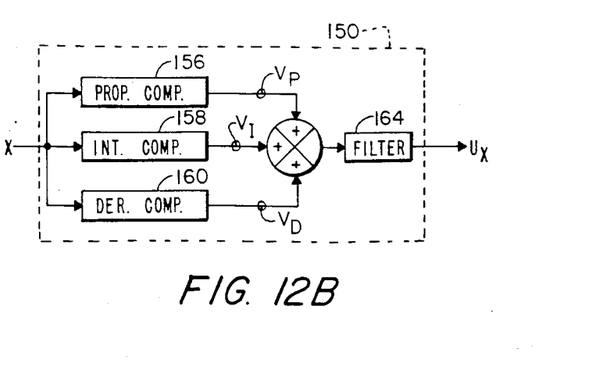
FIG. 12B is a more detailed schematic of an X-axis compensation circuit of FIG. 12A.

X-axis compensation circuit 150 is shown in greater detail in FIG. 12B where displacement signal X is provided simultaneously to proportional compensation circuit 156, integrating compensation circuit 158, and derivative compensation circuit 160. These circuits modify signal X, termed $V_{in}$, according to the formulas:

$$V_P = K_P V_{in} \quad (1)$$

$$V_I = K_I \int V_{in} dt \quad (2)$$

$$V_D = K_D \quad (3)$$

respectively, where $K_p$, $K_I$, and $K_D$ are three respective constants and t is time. The three outputs from these circuits are combined by summer 162 and processed by low pass filter 164.

Figure 13:
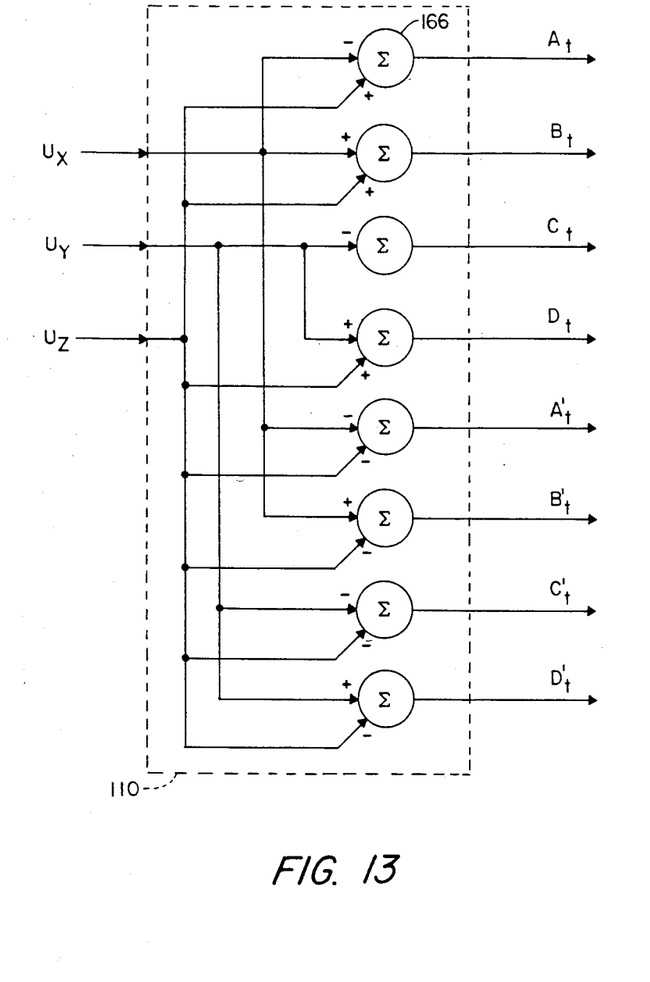
FIG. 13 is a schematic of the coil excitation translational circuit of FIG. 9A.

Coil excitation logic circuit 110 for processing force correction commands provides eight coil corrections commands as indicated in FIG. 13. For example, the inverse of $U_X$ is combined with $U_Z$ in summer 166 to provide coil correction command $A_t$.

The rotation signals are processed in a similar fashion. Inductive sensor signal conditioning circuit 114, FIG. 9B, contains signal normalizing circuits equivalent to those shown in FIGS. 10A and 10B.

Figure 14:
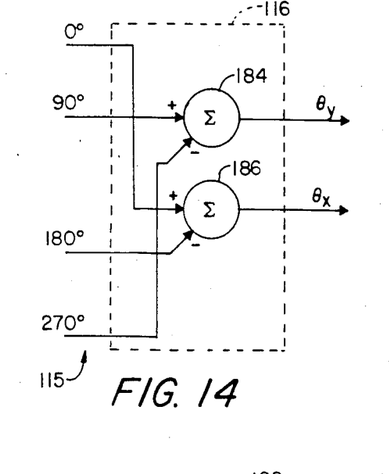
FIG. 14 is a schematic of the rotor angle determining circuit of FIG. 9B.

Rotor angle determining circuit 116, FIG. 14, combines normalized inductive sensor signals 115 at 90° and 270° in summer 184 to provide rotor angle signal $\theta_Y$. Normalized inductive signals at 0° and 180° are combined in summer circuit 186 as illustrated to provide rotor angle signal $\theta_X$.

Figure 15:
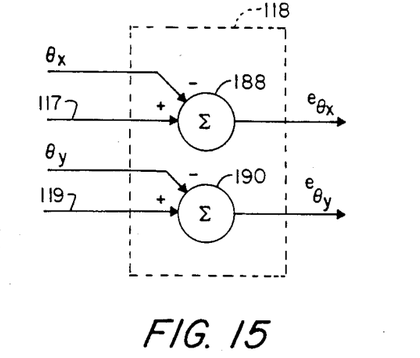
FIG. 15 is a schematic of the summing circuit of FIG. 9B.

Summer circuit 118, FIG. 15, contains summers 188 and 190 for negatively combining rotor angle $\theta_X$ and rotor angle $\theta_Y$ with rotor angle set point commands 117, 119 for those angles. Rotor angle error signals $e_{\theta X}$ and $e_{\theta Y}$ are thereby produced.

Figure 16:
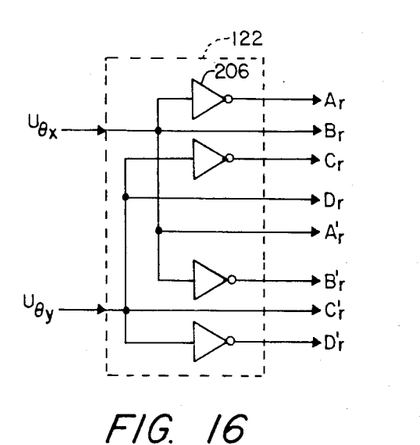
FIG. 16 is a schematic of the coil excitation rotational circuit of FIG. 9B.

Rotational compensation circuit 120, FIG. 9B, includes two compensation circuits for processing rotor angle error signals $e_{\theta X}$ and $e_{\theta Y}$, respectively, into torque correction commands $U_{\theta X}$ and $U_{\theta Y}$. The compensation circuits are equivalent to those shown in FIGS. 12A and 12B. Coil excitation logic circuit 122 distributes torque correction commands $U_{\theta X}$ and $U_{\theta Y}$ into eight coil correction commands as illustrated in FIG. 16. For example, command $U_{\theta X}$ is inverted to provide coil correction command $A_r$.

Figure 17:
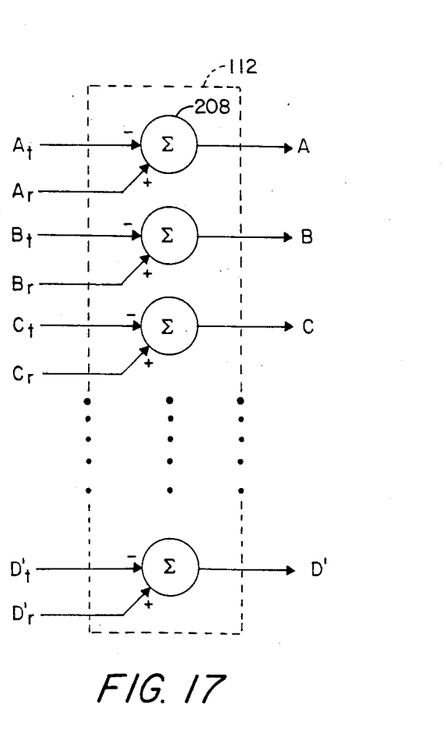
FIG. 17 is a schematic of the summing circuit of FIG. 9A.

Summing circuit 112, FIG. 17, combines the inverse of each of the eight translational coil correction commands $A_t, \ldots D_t'$ with the corresponding rotational coil correction command; the rotational corrective commands were inverted by summing circuit 118, FIG. 9B. Translational coil correction command $A_t$ is combined with rotational coil correction command $A_r$ at summer 208, FIG. 17, for example. A single coil correction command such as command A is then provided to each of the eight coils as described above.

Figure 18A:
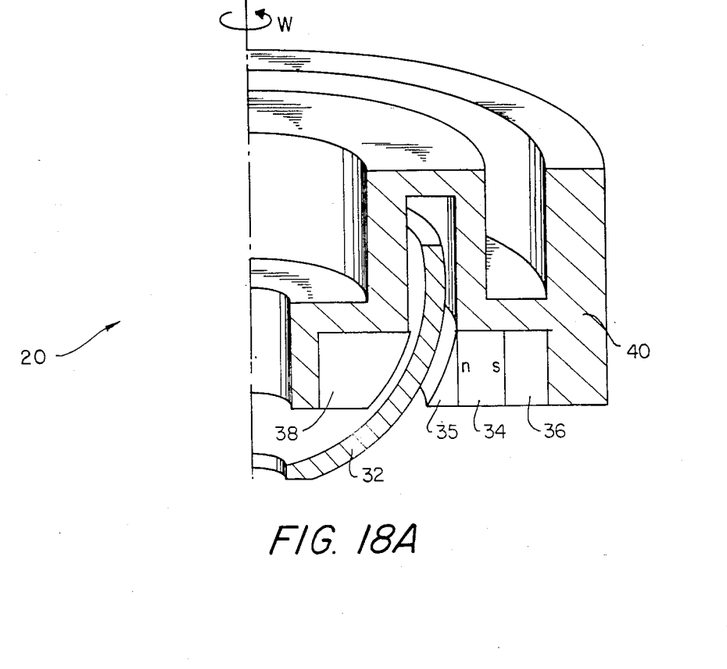
FIG. 18 is an axonometric, partial cross-sectional view of the motor of FIG. 1.
Figure 18B:
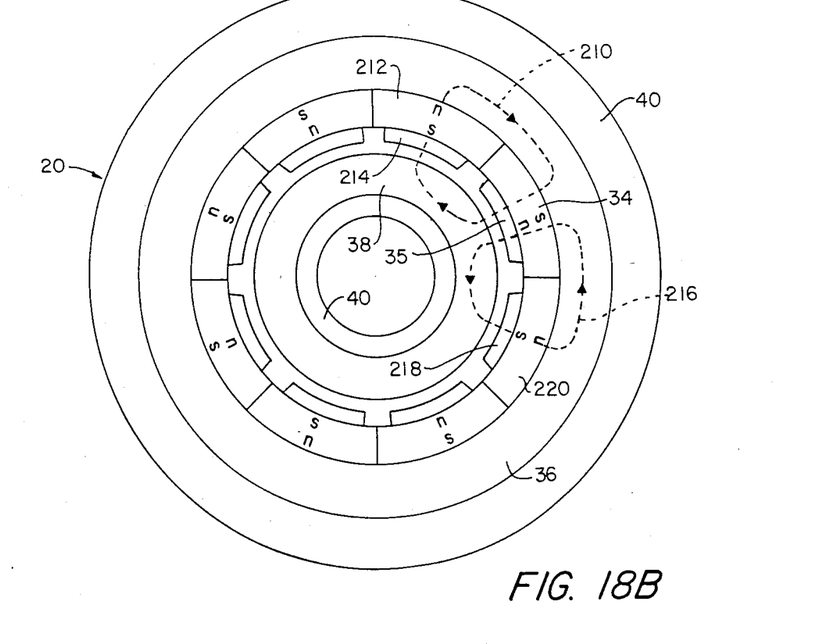
FIG. 18B is a bottom plan view of the motor of FIG. 18A with the stator removed.

Motor/generator 20 is shown in greater detail in FIGS. 18A and 18B. FIG. 18A provides a cross-sectional view; FIG. 18B is a bottom plan view with stator 32 removed for purposes of illustration. Magnetic flux 210 passes through permanent magnet 34 and pole piece 35 which serves to concentrate or focus magnetic flux 210 as it proceeds from the north pole of magnet 34 through return path 38 to pole piece 214 and permanent magnet 212. Similarly, magnetic flux 216 passes from permanent magnet 34 and pole piece 35 to pole piece 218 and permanent magnet 220. Motor/generator 20 operates in a conventional manner.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A magnetic suspension system for a rotary machine comprising:
    two magnetic actuators spaced from each other along a primary axis, each including:
        a stator including a curved support shell having a plurality of coil windings;
        a rotor including a curved annular gap for rotatably receiving said shell and including means for providing a magnetic field in said gap;
        each said gap extending away from the other said gap and converging arcuately toward said primary axis; and
    means for selectively exciting said coils to interact with the magnetic field in each said gap and produce Lorentz forces for suspending each said rotor.

2. The magnetic suspension system of claim 1 in which said support shells are hemispherical.

3. The magnetic suspension system of claim 2 in which each said curved annular gap is hemispherical.

4. The magnetic suspension system of claim 1 in which each said support shell has two pairs of coils.

5. The magnetic suspension system of claim 4 in which one coil of each pair is disposed opposite the other coil of that pair.

6. The magnetic suspension system of claim 1 in which said means for selectively exciting includes means for sensing the position of said rotors along the axial and two radial axes.

7. The magnetic suspension system of claim 6 in which said means for selectively exciting further includes means, responsive to said means for sensing, for determining the position of the center of mass of each said rotor and for maintaining its center of mass at a predetermined position.

8. The magnetic suspension system of claim 7 in which said coil windings of said stators exert forces on said rotors to maintain the center of mass of each said rotor at the predetermined position as controlled by said means for selectively exciting.

9. The magnetic suspension system of claim 1 in which said stators are disposed such that they are diametrically opposed to each other.

10. The magnetic suspension system of claim 1 in which said means for selectively exciting includes means for measuring rotation of each said rotor about two radial axes.

11. The magnetic suspension system of claim 10 in which said means for selectively exciting further includes means, responsive to said means for measuring, for adjusting the rotation angle of each said rotor about the two radial axes.

12. The magnetic suspension system of claim 11 in which said stators apply torques to said rotors to adjust the rotation angles of said rotors.

13. The magnetic suspension system of claim 1 in which each said means for providing a magnetic field provides a homopolar field.

14. The magnetic suspension system of claim 13 in which each said means for providing a magnetic field is an annular permanent magnet.

15. The magnetic suspension system of claim 1 further including a motor/generator having a stator and a rotor which has a curved annular gap for rotatably receiving said motor/generator stator.

16. The magnetic suspension system of claim 15 in which said motor/generator stator is hemispherical.

17. The magnetic suspension system of claim 16 in which said motor/generator rotor gap is hemispherical.

18. The magnetic suspension system of claim 15 in which said motor/generator rotor is attached to both said actuator rotors.

19. A rotary machine comprising:
two magnetic actuator bearings spaced from each other each including:
a stator including a hemispherical support shell having a plurality of coil windings; and
a rotor including a spherical annular gap for rotatably receiving said shell and including means for providing a magnetic field in said gap;
means for selectively exciting said coils to interact with the magnetic field in the gap and to produce Lorentz forces for suspending each said rotor; and
a motor/generator including a hemispherical stator and a rotor having a hemispherical gap for rotatably receiving said motor/generator stator.

20. The rotary machine of claim 19 in which said motor/generator stator is disposed inside of and is concentric with said hemispherical support shells.

21. The magnetic suspension system of claim 1 further including structure coupling together said rotors.

22. The magnetic suspension system of claim 1 in which said means for selectively exciting includes means for controlling the position of each said rotor along the axial and two radial axes.

23. The magnetic suspension system of claim 1 in which the curvature of each said gap matches the curvature of the respective shell to enable each stator to remain at substantially the same distance from respective rotor structure bounding the respective gap as said rotor and said stator move relative to each other transverse to the direction of rotation of said rotor.

24. A magnetic suspension system for a rotary machine comprising:
two magnetic actuators spaced from each other along a primary axis, each including:
a stator including a curved support shell having a plurality of coil windings;
a rotor including a curved annular gap for rotatably receiving said shell to enable movement of said rotor and said stator relative to each other transverse to the direction of rotation of said rotor, said rotor further including means for providing a magnetic field in said gap;
each said gap extending away from the other said gap and converging arcuately toward said primary axis; and
means for selectively exciting said coils to interact with the magnetic field in each said gap and produce Lorentz forces for suspending each said rotor.

25. The magnetic suspension system of claim 24 in which the curvature of each said gap matches the curvature of the respective shell to enable each said stator to remain at substantially the same distance from respective rotor structure bounding the respective gap as said rotor and said stator move relative to each other transverse to the direction of rotation of said rotor.

26. The magnetic suspension system of claim 24 in which said curved annular gaps enable tilting of said primary axis by at least ten degrees.

27. A magnetic suspension system for a rotary machine comprising:
two magnetic actuators spaced from each other each including:
a stator including a hemispherical support shell having at least two pairs of coils;
a rotor including a hemispherical annular gap for rotatably receiving said shell and including means for providing a magnetic field in said gap;
said stators sharing a primary axis and being diametrically opposed to each other, said gaps of said rotors enabling tilting of said primary axis in any radial direction; and
means for selectively exciting said coils to interact with the magnetic field in each said gap and produce Lorentz forces for suspending each said rotor and for controlling the position of each said rotor along the axial and two radial axes.

* * * * *